US009307208B2

(12) United States Patent
Heidrich et al.

(10) Patent No.: US 9,307,208 B2
(45) Date of Patent: Apr. 5, 2016

(54) SYSTEM AND METHOD FOR SOLVING INVERSE IMAGING PROBLEMS

(71) Applicant: The University of British Columbia, Vancouver (CA)

(72) Inventors: Wolfgang Heidrich, Vancouver (CA); Felix Heide, Vancouver (CA); Mushfiqur Rouf, Sunnyvale, CA (US); Matthias Hullin, Bonn (DE)

(73) Assignee: THE UNIVERSITY OF BRITISH COLUMBIA, Vancouver, British Columbia (CA)

( * ) Notice: Subject to any disclaimer, the term of this patent is extended or adjusted under 35 U.S.C. 154(b) by 186 days.

(21) Appl. No.: 14/200,880

(22) Filed: Mar. 7, 2014

(65) Prior Publication Data

US 2015/0254810 A1    Sep. 10, 2015

(51) Int. Cl.
*G06K 9/00* (2006.01)
*H04N 9/04* (2006.01)
*G06T 5/00* (2006.01)

(52) U.S. Cl.
CPC ............... *H04N 9/045* (2013.01); *G06T 5/003* (2013.01); *G06T 5/006* (2013.01); *G06T 2207/10024* (2013.01); *G06T 2207/20021* (2013.01)

(58) Field of Classification Search
CPC ....... H04N 1/4052; H04N 1/52; H04N 9/045; H04N 9/097; H04N 13/0022; H04N 13/0232; H04N 13/0242; G06K 9/00516; G06K 9/40; G06T 5/002; G06T 5/10; G06T 5/20; G06T 7/002; G06T 7/0065; G06T 7/0075; G06T 15/20; G06T 2207/21; G06T 2207/10024; G06T 2207/10052; G06T 2207/20064; G06T 2007/20084; G06T 2207/20192; G02B 27/0075
See application file for complete search history.

(56) References Cited

U.S. PATENT DOCUMENTS 6,847,737 B1 *   1/2005   Kouri ................ G06K 9/00516
                                                            382/260

* cited by examiner

*Primary Examiner* — Jose Couso

(57) ABSTRACT

There is provided a computer-implemented method for solving inverse imaging problems to compensate for distortions in an image. The method comprises: minimizing a cost objective function containing a data fitting term and one or more image prior terms to each of the plurality of channels, the one or more image prior terms comprising cross-channel information for a plurality of channels derived from the image.

31 Claims, 8 Drawing Sheets

SYSTEM AND METHOD FOR SOLVING INVERSE IMAGING PROBLEMS

TECHNICAL FIELD

The following relates to systems and methods for solving inverse imaging problems.

BACKGROUND

Over the past few decades, camera optics have become increasingly complex. For example, the lenses of modern single lens reflex (SLR) cameras may contain a dozen or more individual lens elements, which are used to optimize light efficiency of the optical system while minimizing aberrations, i.e., non-linear deviations from an idealized thin lens model.

Optical aberrations include effects such as geometric distortions, chromatic aberration (wavelength-dependent focal length), spherical aberration (where focal length depends on the distance from the optical axis), and coma (angular dependence on focus). Single lens elements with spherical surfaces typically suffer from these artifacts, and as a result may not be used in high-resolution, high-quality photography. Instead, modern optical systems often feature a combination of different lens elements with the intent of canceling out aberrations. For example, an achromatic doublet is a compound lens made from two glass types of different dispersion, i.e., their refractive indices depend on the wavelength of light differently. The result is a lens that is (in the first order) compensated for chromatic aberration, while still suffering from the other artifacts mentioned above.

Despite typically having better geometric imaging properties, modern lens designs are often not without disadvantages, including a significant impact on the cost and weight of camera objectives, as well as increased lens flare.

That is, modern imaging optics can be highly complex systems with up to two dozen individual optical elements. This complexity is normally required in order to compensate for the geometric and chromatic aberrations of a single lens, including geometric distortion, field curvature, wavelength-dependent blur, and color fringing.

SUMMARY

There is provided a method for solving inverse imaging problems to compensate for distortions in an image, the method comprising: minimizing a cost objective function containing a data fitting term and one or more image prior terms to each of the plurality of channels, the one or more image prior terms comprising cross-channel information for a plurality of channels derived from the image.

There is also provided a computer readable medium comprising computer executable instructions for solving inverse imaging problems to compensate for distortions in an image, comprising computer executable instructions for: minimizing a cost objective function containing a data fitting term and one or more image prior terms to each of the plurality of channels, the one or more image prior terms comprising cross-channel information for a plurality of channels derived from the image.

There is also provided an electronic device comprising a processor and memory, the memory computer executable instructions for solving inverse imaging problems to compensate for distortions in an image, comprising computer executable instructions for: minimizing a cost objective function containing a data fitting term and one or more image prior terms to each of the plurality of channels, the one or more image prior terms comprising cross-channel information for a plurality of channels derived from the image.

BRIEF DESCRIPTION OF THE DRAWINGS

Embodiments will now be described by way of example with reference to the appended drawings wherein.

DETAILED DESCRIPTION

Figure 1:
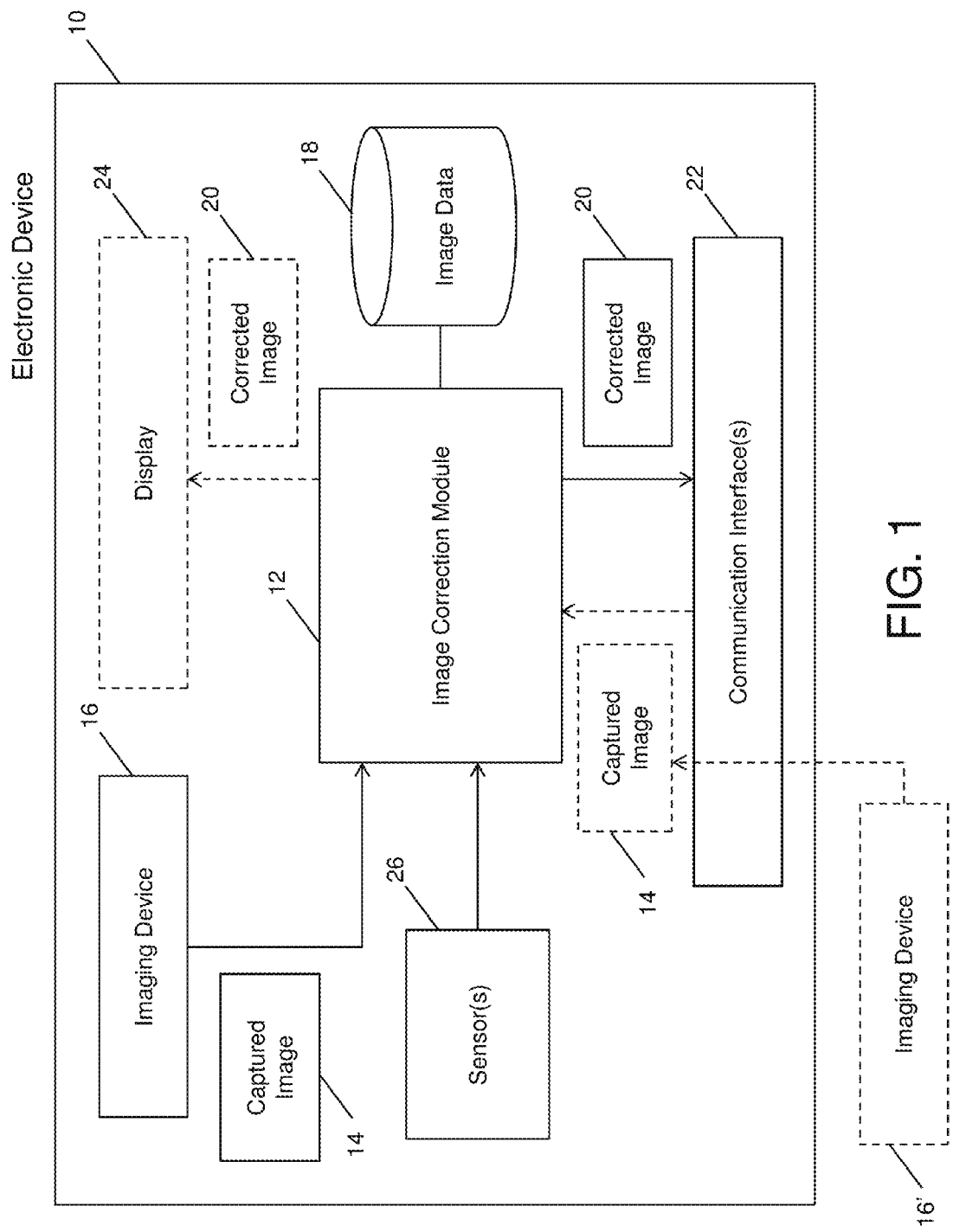
FIG. 1 is a block diagram of an electronic device having an image correction module for correcting images.

The following describes a system and method utilizing computational manipulations of images captured from a camera to remove artifacts and allow for post-capture correction of the images captured through uncompensated, simple optics which are lighter and typically less expensive.

It has been found that while the focusing of different colors through a lens typically results in focusing at different locations, a particular color channel typically focuses in the correct location and has commonality with at least one other color channel. By sharing information between color channels, images can be improved using computational optics, even using simpler lens designs.

In one example, the system can estimate per-channel, spatially-varying point spread functions, and solve non-blind inverse imaging problems (e.g., de-convolution) with a cross-channel analysis. The system may also be configured to jointly apply inverse imaging while considering image information of other channels when modifying only one of the colour channels. The method of jointly solving inverse imaging problems can be advantageous as it is designed to specifically eliminate color fringing. It can be appreciated that for the purposes of illustrating the principles herein, the terms "de-convolution", "inverse imaging", and "solving inverse imaging problems" may be used interchangeably and that other inverse imaging problems (other than de-convolution) are applicable. It can also be appreciated that while the examples described herein refer to inverse imaging of images, the principles equally apply to frames of a video, which may also be considered "images" for this purpose.

There is also provided a computational approach for post correction of images captured from a camera, the images being corrected for aberrations occurring for example during the image capturing process due to limitations from the camera or lens. Accordingly, the proposed system and method presents an alternative approach to enabling high-quality photography. That is, instead of ever more complex optics, the system and method allows computational and automatic or semi-automatic (e.g. with some user input) correction of aberrations thereby allowing the capturing of high quality images, even with poorly performing lenses.

The methods and systems described herein, which exploit cross-channel information, can be configured to be more robust than existing correction methods. The systems and methods according to one example is able to handle much larger and more dense blur kernels, such as disk-shaped kernels with diameters of 50 pixels and more, which occur frequently in uncorrected optics unless the apertures are stopped down to an impractical size. The present system and method may also include a convex solver with convergence properties that can minimize the resulting cross-channel inverse imaging problem (e.g. utilization of channel information from other channels while adjusting one channel).

In one aspect, the components used enable the use of simple lens designs for high-quality photography, for example: a new cross-channel prior for color images, a modification of the cross-channel prior for dark image regions, an efficient determination of the cross-channel prior in an inverse imaging framework and a convex solver for converging to a global optimum, a robust approach for per-channel spatially-varying PSF estimation using a total variation (TV) prior based on the same optimization framework, noise patches in a grid with padding for spatially varying PSF estimation, and the extension and application of the cross-channel prior to multi-spectral images.

Turning now to the figures, FIG. 1 illustrates an electronic device 10 that includes an image correction module 12 for processing a captured image 14 obtained from an imaging device 16. The image correction module 12 is configured to compensate for distortions in images 14 taken from an imaging device 16 such as a camera that resides in/or the electronic device 10, or an external imaging device 16' (shown in dashed lines in FIG. 1). For example, the image correction module 12 can be used to compensate for geometric and chromatic aberrations resulting from limitations or defects in the lens of a camera (e.g. single glass lens limitations). The electronic device 10 may be any device having processing capabilities and may or may not be a device comprising the imaging/camera capabilities (e.g., may be a component or module coupled to such an imaging-equipped device). Examples of camera-equipped devices include, a camera (e.g. SLR camera), cellular phones, cellular smart-phones, computers, laptops, handheld wireless communication devices (e.g., gaming consoles), notebook computers, tablet computers, in-vehicle systems, endoscopes, or any other portable electronic device with image capture and communication capabilities.

The electronic device 10 may include or otherwise have access to image data 18, e.g., a memory card or other data storage mechanism, which can store captured or received images prior to processing, as well as processed images prior to displaying or sending. The image correction module 12 is configured to receive or obtain a captured image 14 and generate a corrected image 20. The corrected image 20 can be sent to another device, e.g., via a communication interface 22 such as a physical or wireless connection, or can be displayed on a display 24 when the electronic device 10 has such capabilities as shown in dashed lines in FIG. 1. It can be appreciated that the electronic device 10 may include various other processing, memory, input and communication components not shown in FIG. 1.

The imaging device 16, 16' may be a camera having a single lens element which suffers from various artifacts. However, it can be appreciated that the principles discussed herein may equally apply to other lens and camera configurations that result in aberrations.

The image correction module 12 includes or otherwise has access to programmed instructions or modules for performing a joint inverse imaging of image channels. Such a joint inverse imaging functionality may comprise computer executable instructions that are configured to obtain a digital image 14 captured from the imaging device 16 or stored on in the image data 18. Further information can be stored on the electronic device 10 and be made accessible to the image correction module 12 (and inverse imaging functionality) such as the type of camera used, lens characteristics, and sensor characteristics, to name a few.

Figure 2:
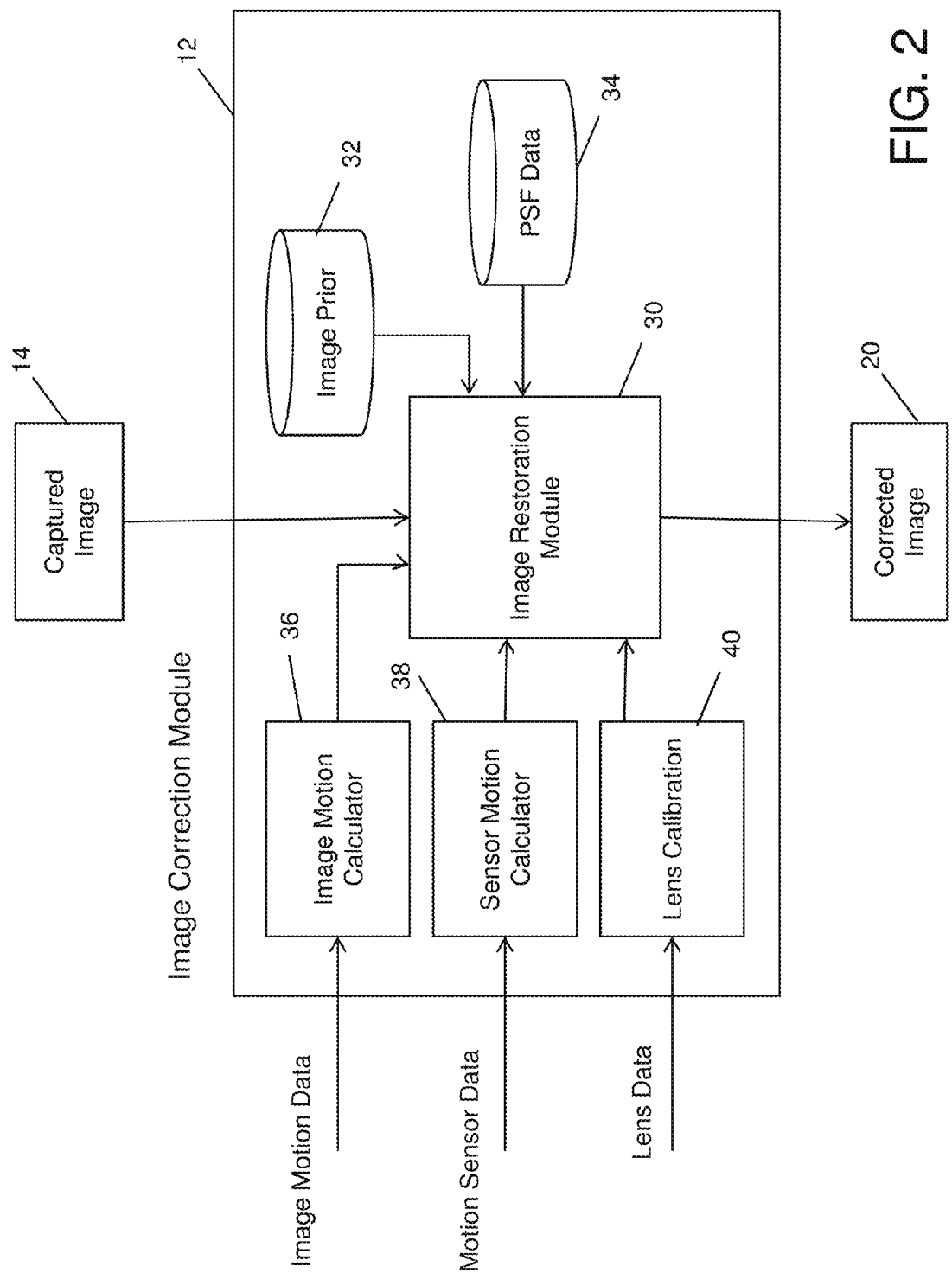
FIG. 2 is a block diagram of an example of a configuration for the image correction module shown in FIG. 1.

FIG. 2 illustrates an example of a configuration for the image correction module 12. The image correction module 12 in this example includes an image restoration module 30. The image restoration module 30 may be configured or programmed to address motion blur, as well as blur caused by specific lenses. As illustrated in FIG. 2, the image correction module 12 may therefore include an image motion calculator 36 for processing image motion data and a sensor motion calculator 38 for processing motion sensor data to be used by the image restoration module 30 in performing motion blur correction. Also shown in FIG. 2 is a lens calibration module 40 for processing lens data (e.g., pre-stored or learned data) to be used by the image restoration module 30 in compensating for lens-specific aberrations, as discussed herein. To perform the image correction (e.g. deblurring) as herein described, the image correction module 12 uses image prior models 32 and PSF data 34, as will be discussed in greater detail below. An image prior is an equation or function that describes or represents some information about natural looking images (as opposed to unnatural images which are a collection of pixels and pixel values). Image priors are typically not specific to one exact image, but instead may be used to describe constraints or facts about an entire class of images (e.g., indoor images, portraits, nature scenes, etc.). In other words, image priors may be considered rules that hold true for "good" images (those collections of pixel values representing images belonging to the class) and that are considered false for "bad" images (those collections of pixels not representing images belonging to the class). Such rules may be useful in an inverse imaging minimization problem since they allow one to choose from many possible solutions the ones that satisfy the "rules about images" the best.

Figure 3:
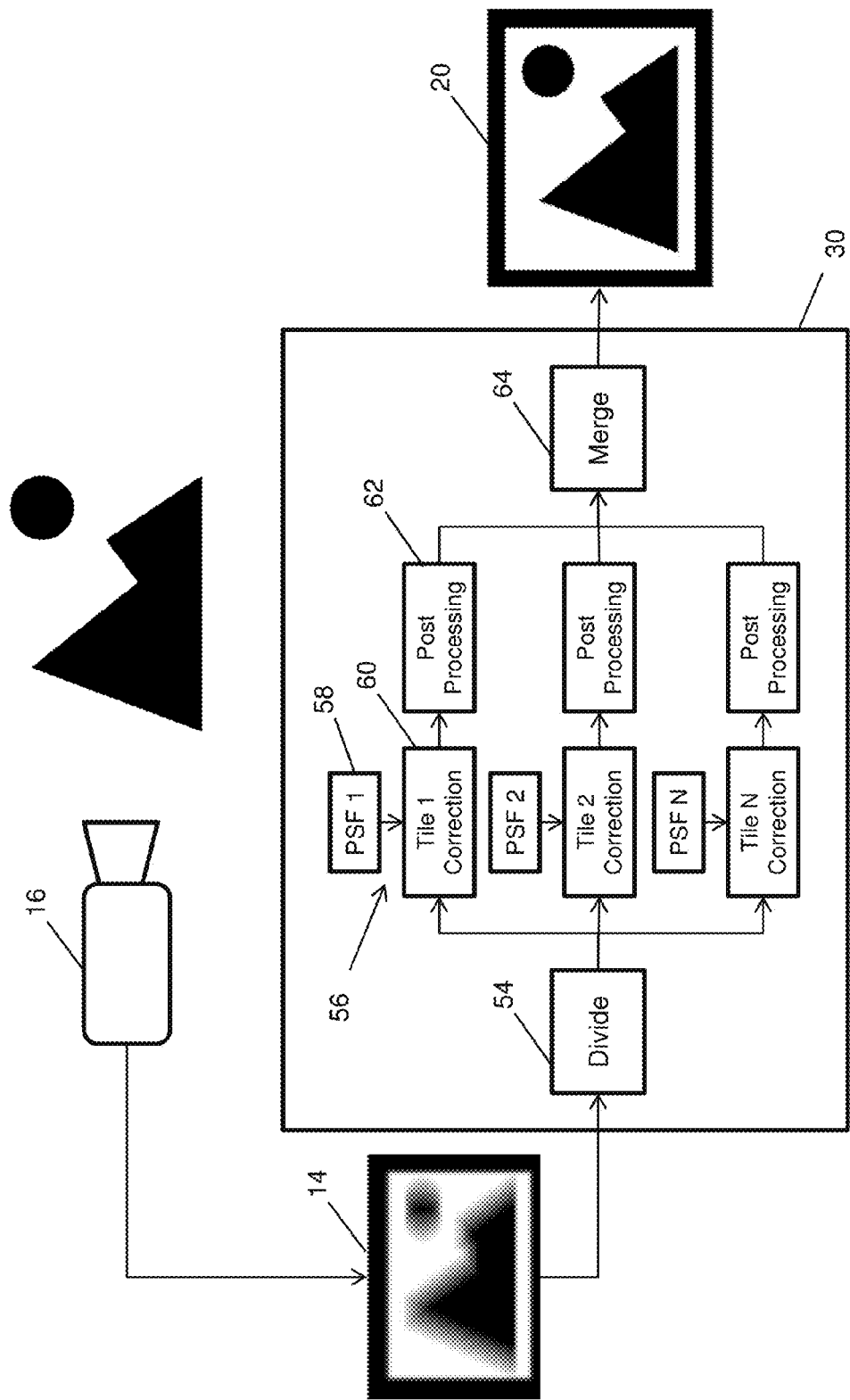
FIG. 3 is a block diagram of an example of an image restoration module configured to process individual image tiles.

Turning now to FIG. 3, the image restoration module 30 of the image correction module 12 is configured to estimate the PSF 58 of each tile 60 in an image 14 that is divided by a divide module 54, for a number of tile stages 56, (1 to N as shown in FIG. 3). That is, the image restoration module 30 calculates calibration information relating to the PSF 58 of each image tile 60 in a calibration image using a post processing operation 62. As discussed in greater detail below, the colour channel decompositions may be compared within each tile stage 56 and across adjacent tiles 60 across the image 14. For example, in one case it may be seen that in a particular tile, the green colour channel does not blur as much as the red colour channel. This indicates that there is more information in the green channel within that tile in order to restore the red channel information. The internal and external tile comparisons within an image provide a measure of PSF values 58 for each tile. Subsequently, these PSF values 58 are applied (e.g. as normalization values) to correct one or more tiles 60 in an image 14 that is captured by the imaging device 16. The tiles can then be re-merged by a merge module 64 to form a re-constructed corrected image 20 as illustrated in FIG. 3.

Figure 4:
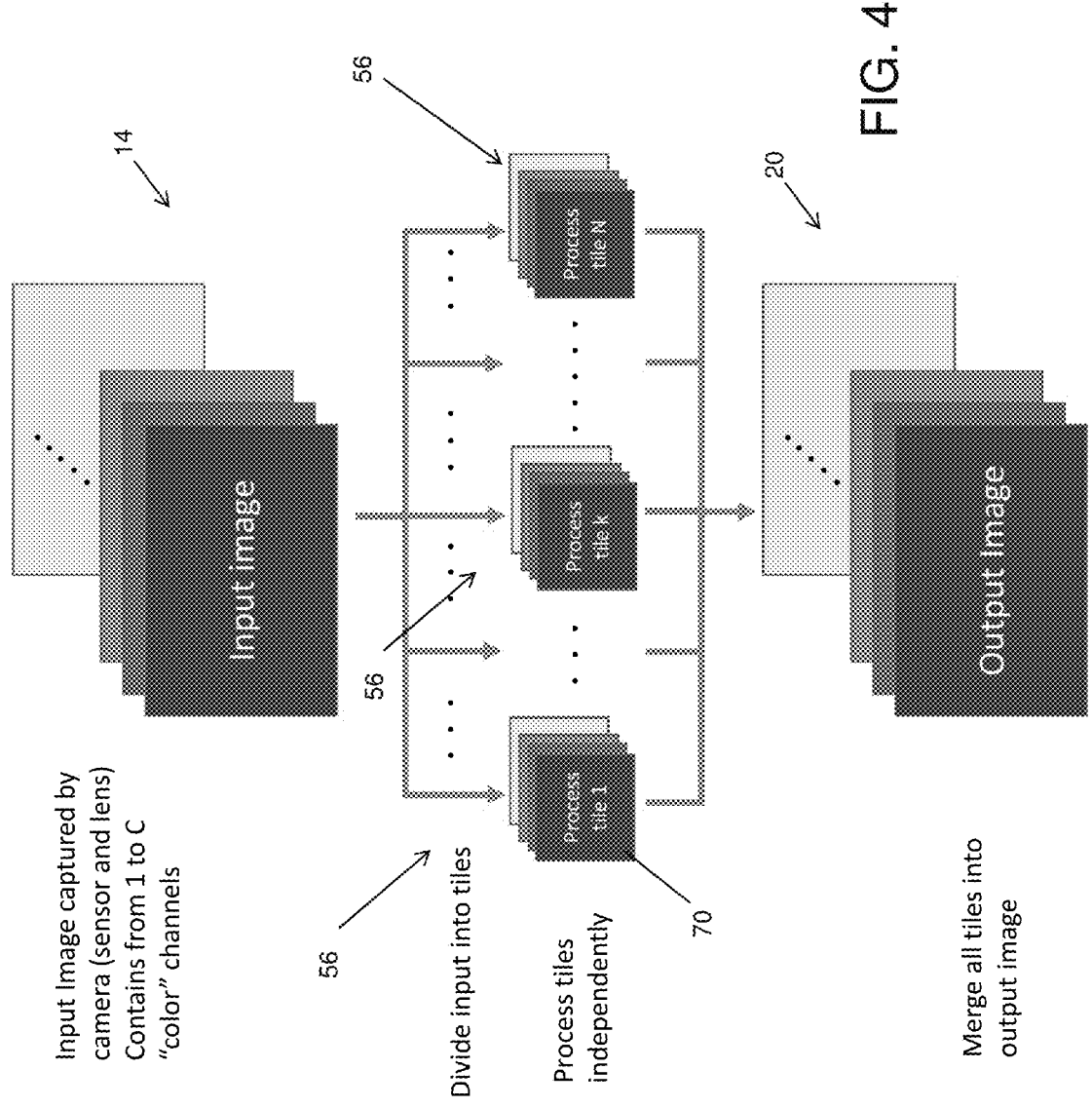
FIG. 4 is a flow chart illustrating the processing of individual image tiles for multiple color channels.

Turning now to FIG. 4, it can be appreciated that the digital image may include image information for a number of colour channels, colors 1 to C being shown in FIG. 4 (e.g., RGB colour frequencies). The joint inverse imaging module in the examples described herein separates the number of color channels into their component colour channels for processing in each of a plurality of independent tile processing operations 70, each colour channel corresponding to actual colours used (e.g., three channels corresponding to the RGB colour spectrum). As will be described later, since one colour channel is typically focused significantly better than another channel, the joint inverse imaging module can be configured to utilize the image information preserved or with lower degree of aberrations in one channel (e.g., if the red channel has focused better and thus features are shown more clearly in the red spectrum than the green and blue channels) for reconstructing the information in the other channels.

Figure 5:
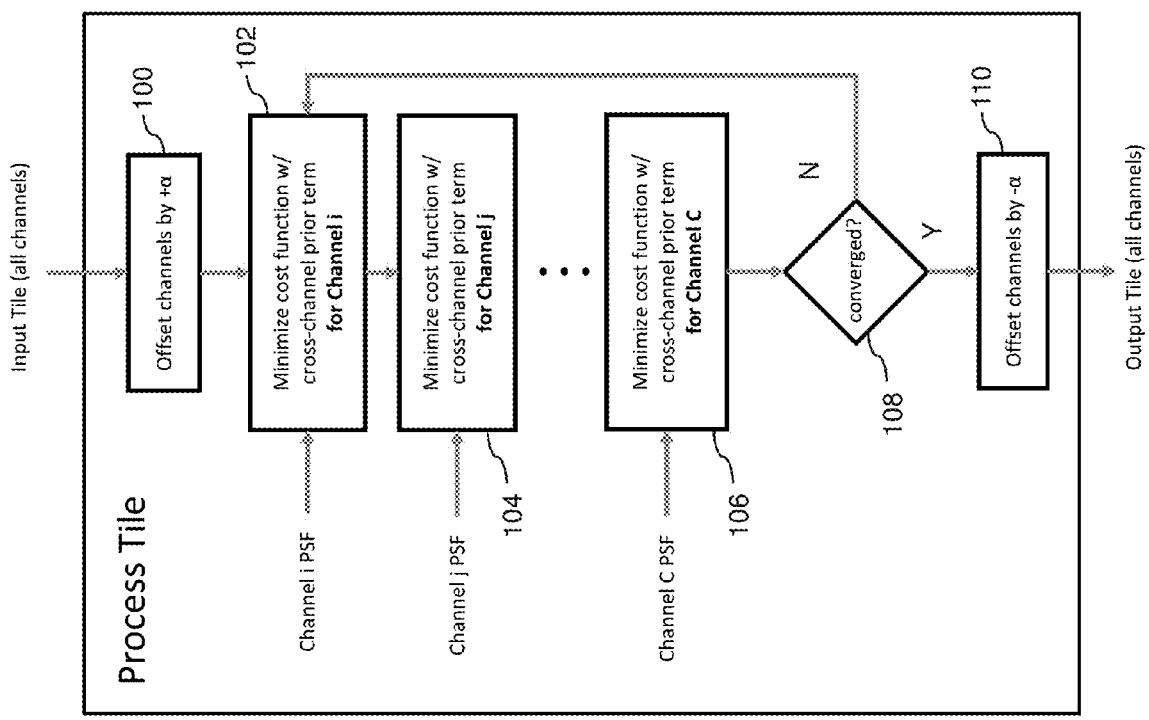
FIG. 5 is a flow chart illustrating example computer executable operations that may be performed in iteratively processing an image tile.

As illustrated in FIG. 5, the joint inverse imaging functionality can be configured for reconstructing an overall image by iteratively minimizing distortions in one colour channel (e.g., red) of the plurality of colour channels while maintaining the image components in the remaining colour channels (e.g., green and blue) of the plurality of colour channels, wherein minimizing such distortion is based upon a comparison of image components in the one colour channel to image components in the remaining colour channels. The image components may then be adjusted in the one colour channel to normalize and correct with respect to the remaining colour channels. This can be particularly advantageous, for example, since different wavelengths have different optimal focus points.

As shown in FIG. 5, a tile is input for all channels and the channels are offset by +α (e.g. by adding 1) at 100 to deal with low intensity image regions as discussed in greater detail below in section 2.7. Using the channel i PSF, the cost function is minimized at 102 with the cross-channel prior term for channel i while maintaining the image components in the other channels. Such minimization of the cost function is repeated at 104 and 106 in this example for channels j through C (i.e., for the remaining channels). The image correction module 12 determines at 108 whether or not it has converged onto a desired output (e.g. when it is observed that the values in most if not all channels become substantially unchanged with subsequent iterations). If not, the cost function is further minimized. If so, the channels are offset by −α at 110 to reverse the above-noted offset, and the tile is output for all channels.

Once the iterative process is repeated for all channels, the restored channel information from all channels is therefore recomposed to output a reconstructed image having minimized distortions. For example, the resultant corrected image 20 may be sent to an external device for displaying, or be displayed directly by the electronic device on the display 24. The joint inverse imaging functionality is advantageously based upon the minimization values discussed further below, with respect to the image prior and cross-channel prior terms. That is, the image prior and cross-channel prior terms can be pre-stored or be otherwise accessible to the electronic device 10. Typically, the image prior information 114 provides a representation that captures prior knowledge about image statistics and patterns. The image prior information 114 can also include camera specific information regarding, for example, types of aberrations and location of aberrations that are expected with a specific camera or associated sensors.

Making reference now to FIGS. 6 through 9 as indicated below, further detail regarding operation of the image correction module 12 is provided.

1.0 Overview of Optimal First-Order Primal-Dual Convex Optimization

In one example, to solve both the image inverse imaging and the PSF estimation problem for working with simple lenses, optimization methods may be derived based on the optimal first-order primal-dual framework (e.g., by Chambolle and Pock, T. 2011, "A first order primal dual algorithm for convex problems with applications to imaging, J. Math. Imaging Vis. 40, 120-145).

The optimization framework considers general problems of the form:

$$x_{opt} = \operatorname*{argmin}_{x} F(Kx) + G(x) \quad (1)$$

For example, in an inverse problem with a TV regularizer, the first term in Eq. (1) is the regularizer (that is $K(x)=\nabla x$, $F(y)=\|y\|_1$ for TV), while the second term is the data fitting term (some residual norm).

Let X, Y be finite-dimensional real vector spaces for the primal and dual space, respectively. The operators from Eq. (1) are then formally defined as:

$K: X \rightarrow Y$ is a linear operator from $X$ to $Y$ $G: X \rightarrow [0,+\infty)$ is a proper, convex, (l.s.c.) function.

$F: Y \rightarrow [0,+\infty)$ is a proper, convex, (l.s.c.) function. (2)

where l.s.c. stands for lower-semicontinuous. The dual problem of Eq. (1) is given as $$y_{opt} = \operatorname*{argmax}_{y} - G^*(-K^*y) + F^*(y) \quad (3)$$

where * denotes the convex conjugate. To solve the above (primal and dual) problem, the following algorithm is proposed by Chambolle and Pock (2011):

Algorithm 1. (First-Order Primal-Dual Algorithm)
Initialization: Choose τ, σ∈ℝ⁺, θ=1 with $\tau\sigma L^2 < 1$
Choose initial iterates $(x_0, y_0) \in X \times Y$, $\bar{x}_0 = x_0$
Iterations (n≥0): Update $x_n$, $y_n$, $\bar{x}_0$ as following:

$$\begin{cases} y_{n+1} = prox_{\sigma F^*}(y_n + \sigma K \bar{x}_n) \\ x_{n+1} = prox_{\tau G}(x_n + \tau K^* y_{n+1}) \\ \bar{x}_{n+1} = x_{n+1} + \theta(x_{n+1} - x_n) \end{cases}$$

The resolvent or proximal operator with respect to G is defined as:

$$prox_{\tau G}(\tilde{x}) := (I + \tau \partial G)^{-1}(\tilde{x}) \quad (4)$$

$$= \operatorname*{argmin}_{x} \frac{1}{2\tau} \|x - \tilde{x}\|_2^2 + G(x)$$

and analogously for $prox_{\sigma F} := (\Pi + \sigma \partial F)^{-1}$. The parameter L, which is necessary to compute valid τ, σ, is defined as the operator norm $L=\|K\|_2$.

2.0 Deblurring

Now addressed is a specific and efficient inverse imaging method based on the general optimization framework. There is provided an image formation model, and a cross-channel prior for de-convolving multichannel images. In one aspect, there is provided an optimization method for inverse imaging with this term, and casting it into the framework from the previous section. In one aspect, the method further comprises a process for dealing with dark image regions. The method allows integration into an efficient scale-space inverse imaging method.

2.1 Image Formation Model

Consider a grayscale image tile captured with n×m resolution. Let J, I, N$\Delta \mathbb{R}^{n \times m}$ be the observed captured image, the underlying sharp image and additive image noise, respectively. The formation of the blurred observation with the blur kernel B can then be formulated as:

$$J = B \otimes I + N \quad (6)$$

$$j = Bi + n \quad (7)$$

In the second form, B, j, i and n are the corresponding quantities in matrix-vector form. As mentioned above, an actual digital image 14 will be composed of many tiles 60, each with a PSF that is assumed constant over the tile 60.

2.2 Inverse Imaging with Cross-Channel Information

Real optical systems typically suffer from dispersion in the lens elements, leading to a wavelength dependency of the PSF known as chromatic aberration. While complex modern lens assemblies are designed to minimize these artifacts through the use of multiple lens elements that compensate for each other's aberrations, it may be noted that even very good lenses still have a residual amount of chromatic aberration. For the simple lenses considered herein, the chromatic aberrations can be very severe—i.e. where one color channel is focused significantly better (although never perfectly in focus) than the other channels, which are blurred beyond recognition (excluding achromatic lenses which compensate for chromatic aberrations).

Figure 6:
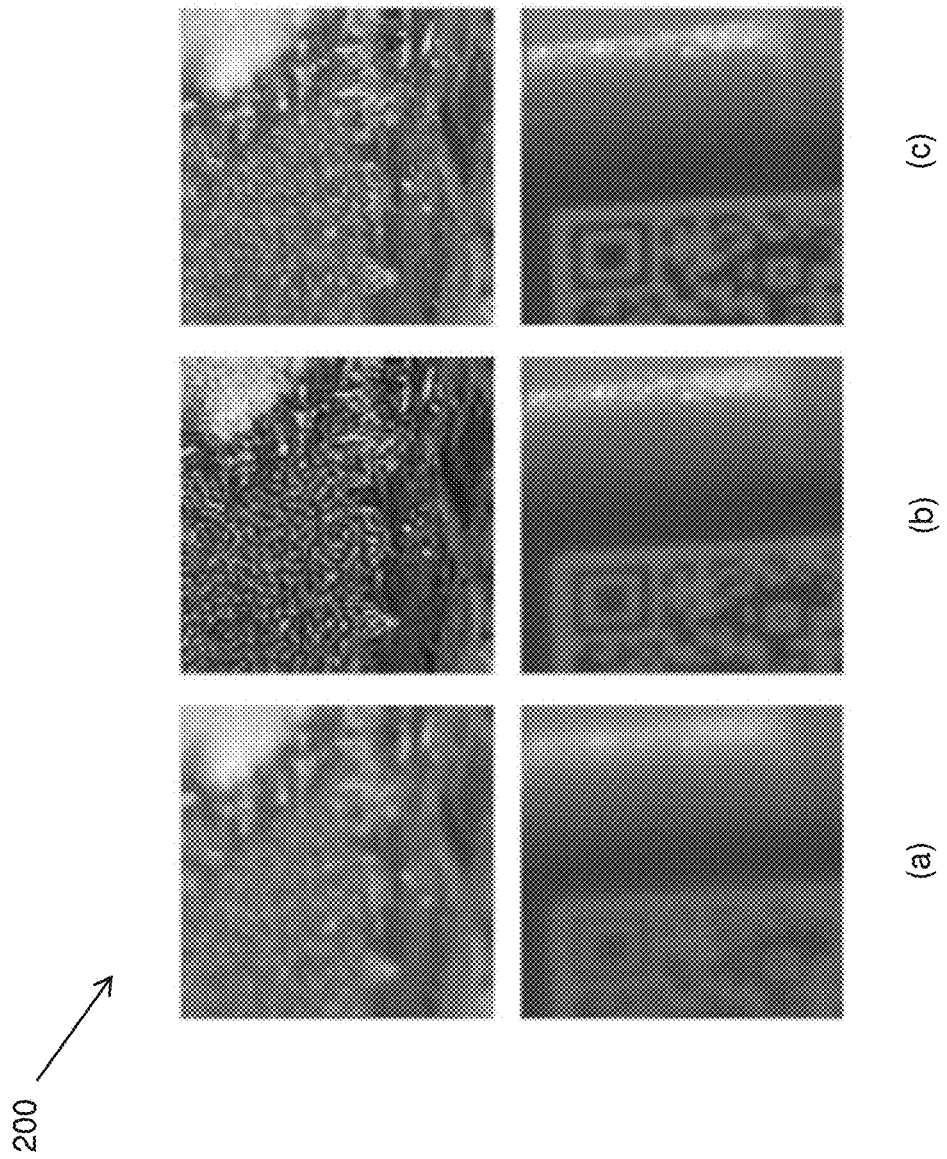
FIG. 6 is a series of images illustrating the effect of using cross-channel priors for two image patches.

Given individual PSFs $B_{\{1 \ldots 3\}}$ for each color channel $j_{\{1 \ldots 3\}}$ an image J attempting to independently de-convolve each color channel does not in general produce acceptable results, since frequencies in some of the channels may be distorted beyond recovery as shown in FIG. 6. FIG. 6 illustrates the effect of using cross-channel priors for two image patches. The left pair (a) shows the original blurred capture, the middle pair (b) shows independently convolved results for each channel using a previous technique, and the right pair (c) shows inverse imaging result using the presently described technique using cross-channel prior.

Figure 7:
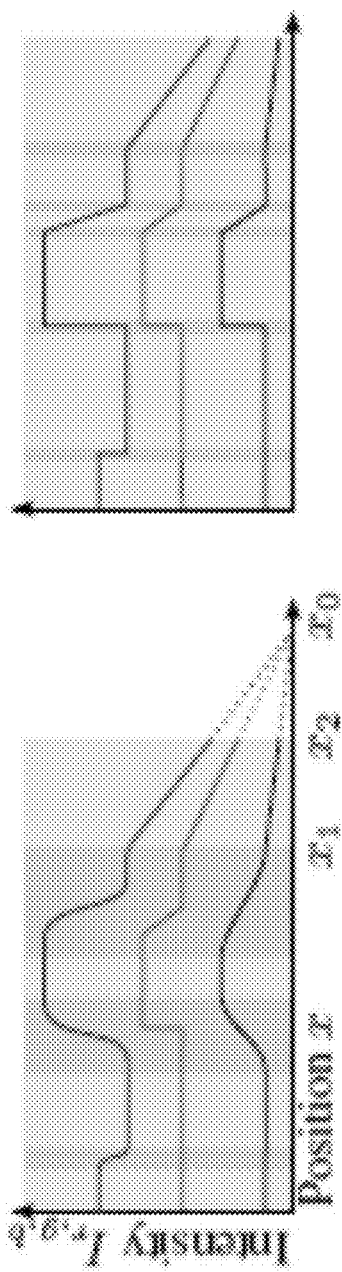
FIG. 7 illustrates blurred and reconstructed scanlines.

The technique described herein allows for the sharing of information (e.g. effect of aberrations, amount of distortion, location of distortion, type of distortion, and channel of distortion) between the inverse imaging processes of the different channels, so that frequencies preserved in one channel can be used to help the reconstruction of the captured image in another channel. In one example, the cross-channel prior is based on the assumption that edges in the image appear in the same place in all channels, and that hue changes are sparse throughout the image (see also FIG. 7). FIG. 7 illustrates a blurred scanline in the left graph with different PSFs in each channel and a sharp green channel. A reconstructed scanline is shown in the right graph. The described cross-channel regularizer may be used to enforce gradient consistency between the color channels and to allow sparse hue changes. Constant regions and pure luma gradients have a low regularizer energy, but changes in chroma are penalized. For the region between $x_1$ and $x_2$, the extrapolated intensities of all channels intersect the x-axis in the same point, $x_0$, which visualizes equation (8) below. by using an $l_1$ norm, sparse chroma changes occurring exactly at edges (right) are preferred over wider regions (left) that are typically perceived as color fringing.

These assumptions lead to the following prior for a pair of channels:

$$\nabla i_k / i_k \approx \nabla i_l / i_l$$

$$\leftrightarrow \nabla i_k \cdot i_l \approx \nabla i_l \cdot i_k \quad (8)$$

which is enforced in a sparse ($l_1$) fashion. It may be noted that the division and multiplication /, · are pixel-wise operators in this example.

2.3 Minimization Problem

Using the cross-channel prior the problem of jointly solving the inverse imaging problem for all channels can be formulated as the optimization problem:

$$(i_{1\ldots 3})_{opt} = \arg\min_{i_{1\ldots 3}} \sum_{c=1}^{3} \|B_c i_c - j_c\|_2^2 + \lambda_c \sum_{a=1}^{5} \|H_a i_c\|_1 + \sum_{l \neq c} \beta_{cl} \sum_{a=1}^{2} \|H_a i_c \cdot i_l - H_a i_l \cdot i_c\|_1 \quad (9)$$

where the first term is a standard least-squares data fitting term, and the second term enforces a heavy-tailed distribution for both gradients and curvatures. The convolution matrices $H_{\{1,2\}}$ implement the first derivatives, while $H_{\{3 \ldots 5\}}$ correspond to the second derivatives. An $l_1$ norm is employed in this method rather than a fractional norm. This ensures that the problem is convex. The last term of Eq. (9) implements the cross-channel prior, again with a $l_1$ norm. $\lambda_c$, $\beta_{cl} \in \mathbb{R}$ with c, $l \in \{1 \ldots 3\}$ are weights for the image prior and cross-channel prior terms, respectively.

2.4 Inverse Imaging Algorithm

The minimization from Eq. (9) can be implemented by alternately minimizing with respect to one channel while fixing all the other channels. To optimize for this single channel $x = i_c$ a first-order primal-dual algorithm is derived adopting the framework described in Sec. 1.0.

First, the optimization (which may be used in the process shown in FIG. 5) is rewritten in matrix-vector form as $$(i_c)_{opt} = \arg\min_x \left\| \begin{bmatrix} \lambda_c H_1 \\ \vdots \\ \lambda_c H_5 \\ \beta_{cl}(D_{i_l} H_1 - D_{H_1 i_l}) \\ \vdots \\ \beta_{cl}(D_{i_l} H_2 - D_{H_2 i_l}) \\ \vdots \end{bmatrix} x \right\|_1 + \|B_c x - j_c\|_2^2 \quad (10)$$

$$= \arg\min_x \|Sx\|_1 + \|B_c x - j_c\|_2^2$$

where here D denotes the diagonal matrix with the diagonal taken from the subscript vector. S is a matrix consisting of the sequence of all $t = 5 + 2(3-1)$ matrices coming from the $l_1$ minimization terms in Eq. (9). By comparison with Eq. (1), the following can now define:

$$K(x) = Sx$$

$$F(y) = \|y\|_1$$

$$G(x) = \|B_c x - j_c\|_2^2 \quad (11)$$

Given this structure, the following resolvent operators used to apply Algorithm 1 are:

$$y = \text{prox}_{\sigma F^*}(\tilde{y}) \Leftrightarrow y_i = \frac{\tilde{y}_i}{\max(1, |y_i|)} \quad (12)$$

$$x = \text{prox}_{\tau G}(x)$$

$$\Leftrightarrow 0 = \frac{1}{\tau}(x - \tilde{x}) + 2(B_c^T B_c x - B_c^T j)$$

$$\Leftrightarrow x = \mathcal{F}^{-1}\left(\frac{\tau 2 \mathcal{F}(B_c)^* \mathcal{F}(j_c) + \mathcal{F}(\tilde{x})}{\tau 2 |\mathcal{F}(B_c)|^2 + 1}\right) \quad (13)$$

where F( ) in the last line denotes the Fourier transform and $\tilde{x}$, $\tilde{y}$ are the function variables of the proximal operators as defined in Eqn. (4). The first proximal operator is a per-pixel projection operator. The second proximal operator is the solution to a linear system as shown in the second line. Since the system matrix is composed of convolution matrices with a large support this linear system can be efficiently solved in the Fourier domain (last line).

Thus, the convex conjugate K* of the linear operator K, which is given as follows:

$$K^* = S^T = [S_1^T \ldots S_t^T] \quad (14)$$

$$= [\lambda_c H_1^T \ldots \lambda_c H_5^T \beta_{cl}(H_1^T D_{i_l} - D_{H_1 i_l}) \ldots ]$$

where t is the number of matrices S is composed of. In summary, the matrix-vector multiplication K*(y) in Algorithm 1 can be expressed as the following sum:

$$K^*(y) = S^T y = \Sigma_{k=1}^{t} S_k^T y_{[(k-1)\cdot nm, \ldots, k\cdot nm-1]} \quad (15)$$

where each $S_k^T$ is just a sum of filtering operations and point-wise multiplications. Likewise, the resolvent operators given above can be implemented using small filtering operators or the FFT for larger filters.

Parameter Selection

Algorithm 1 converges to the global optimum of the convex functional if $\theta=1$, $\tau\sigma L^2<1$ with $\tau,\sigma>0$ and $L=\|K\|_2$.

$$\theta = 1, \sigma = 10 \text{ and } \tau = \frac{0.9}{\sigma L^2}$$

are used for the inverse imaging method described here. Next, consider how to compute the operator norm L. Since we have K(x)=Sx where S was a matrix, $\|K\|_2$ is the square root of the largest eigenvalue of the symmetric matrix $S^{TS}$. The value L can be found by using the power iteration where again all matrix-vector-multiplications with $S^T S$ can be decomposed into filtering operations.

2.5 Regularization for Low-Intensity Areas

In yet another aspect, there is provided a modification of the basic cross-channel prior that produces improved results in dark regions, i.e., for pixels where all channel values approach zero. In these regions, the prior from Eq. (8) may not be effective, since the hue normalization reduces the term to zero. As a result, significant color artifacts (such as color ringing) can remain in dark regions. Note that by allowing luma gradients in the original cross-prior an inherent design problem of this prior can be introduced, rather than an optimization issue. In these regions, it is proposed to match absolute (rather than relative) gradient strengths between color channels. The operator G from Eq. (11) is modified as:

$$G(x) = \|B_c x - j_c\| + \lambda_b \Sigma_{l\neq c} \Sigma_{a=1}^{2} \|D_w(H_a x - H_a i_l)\|_2^2 \quad (16)$$

where $D_w$ is a spatial mask that selects dark regions below a threshold $\epsilon$. The mask is blurred slightly with a Gaussian kernel $K_\sigma$ to avoid spatial discontinuities at the borders of regions affected by the additional regularization term:

$$w = \left(1 - \frac{\sum_l \beta_{cl} T(i_l)}{\sum_l \beta_{cl}}\right) \otimes K_\sigma \text{ with } T(i)_k = \begin{cases} 1 & \text{if } i_k \leq \epsilon \\ 0 & \text{else} \end{cases},$$

with $\epsilon=0.05$ and $\sigma=3$ in our implementation.

The resolvent operator with respect to G from Eq. (13) is replaced by the following derivation:

$$u_{opt} = \text{prox}_{\tau G}(\tilde{u})$$

$$\Leftrightarrow [2\tau B_c^T B_c + \Pi + 2\tau \lambda_b \Sigma_{l\neq c} \Sigma_{a=1}^{2} H_a^T D_w^2 H_a]$$
$$u_{opt} = 2\tau b_c^T j_c + \tilde{u} + 2\tau \lambda_b \Sigma_{l\neq c} \Sigma_{a=1}^{2} H_a^T D_w^2 H_a i_l$$

$$\Leftrightarrow A u_{opt} = b \quad (17)$$

This expresses the solution of the resolvent operator as the matrix inversion problem $Au_{opt}=b$. Since blur kernel sizes of the order of magnitude of $10^2 \times 10^2$ can be expected for practical applications, A is very large and impractical to invert explicitly. The system is solved using the Conjugate Gradient (CG) algorithm. This allows the matrix-vector multiplication to be expressed in the CG-algorithm as a sequence of filtering operations as before.

2.6 Residual and Scale-Space Inverse Imaging

In one embodiment, the method handles saturation in the captured image by removing the rows where j is saturated from the data fitting term. This is done by pre-multiplying the residual $B_c x - j_c$ with a diagonal weighting matrix whose diagonal is 0 for saturated rows and 1 else; the derivation from Eq. (17) is changed straightforwardly.

Figure 8:
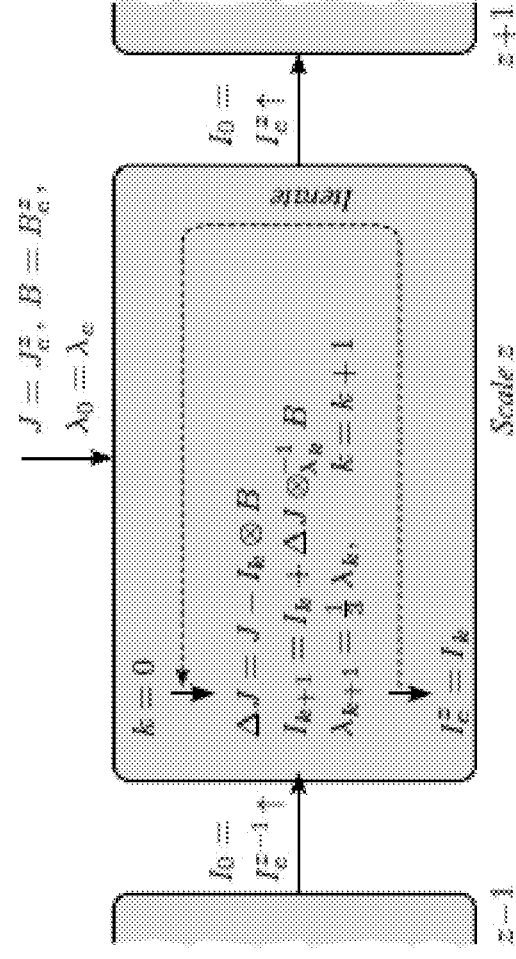
FIG. 8 is a block diagram illustrating an example of an iterative solver for inverse imaging problems.

An iteration is shown in FIG. 8, which minimizes (or eliminates) ringing artifacts. the operator $\otimes_{\lambda_k}^{-1}$ is the inverse imaging of the image to the left using the kernel to the right and a regularizer-weight $\lambda_k$. The algorithm may be performed in scale space for performance reasons.

To increase the performance of the algorithm by using good starting points for Eq. (10), the method is performed in scale space. The pyramids $\{J\hat{\ }z\}\_(z=0)\hat{\ }Z, \{B\hat{\ }z\}\_(z=0)\hat{\ }Z$ of the captured image/kernel pairs are computed by bicubic downsampling of J,B with the scale factor ½. The reconstruction pyramid $\{I\hat{\ }z\}\_(z=0)\hat{\ }Z$ is progressively recovered from coarse (scale 0) to fine, where at each scale the initial iterate is the up-sampled result of the next coarser level. Note, that our scale space implementation purely serves as a performance improvement. In particular we do not need to overcome local minima in our minimization problem since it is convex. Contrary to other methods we are not using any information from coarser scales in the image correction at a considered scale. Since the reconstructions can contain significantly less detail we found that guiding fine scale image correction with coarser scale information is problematic in many cases.

2.7. Avoiding Low-Intensity Areas

As discussed above, to address low-intensity areas in an image, it has been found that an offset can be applied to bring the low-intensity values into a suitable range for processing.

Let B, as defined above in Eq. (6), be assumed to be energy preserving (i.e. the sum of all entries equals 1). Let $\hat{1}$ be defined as the constant image in $\mathbb{R}^{n \times m}$ containing the positive constant value $\alpha$ at every pixel. Therefore (letting the relevant terms be as defined in Eq. 6 and Eq. 7):

$$J + \hat{I} = B \otimes I + \hat{I} + N$$
$$= B \otimes I + B \otimes \hat{I} + N$$
$$= B \otimes (I + \hat{I}) + N$$

Step 2 follows under the standard convolution operator because B is normalized to 1 (energy preserving) and $\hat{I}$ is constant.

Section 2.5 above introduces modifications to the standard method above that deal with low-intensity image regions. The benefit of this formulation is that there are no longer any low-intensity regions to contend with. For example, assuming original image values between 0 and 1 and $\alpha=1$, then after offsetting, all image values are now between 1 and 2, and therefore the standard method developed in section 2.4 can be applied with minimal modifications. The new procedure is a. Let $\hat{J}=J+\alpha$ b. Apply the procedure from section 2.4 to $\hat{J}$, generating intermediate output image $\hat{I}$ c. Subtract 1 to produce the final output image, $I=\hat{I}-\alpha$

3.0. PSF Estimation

The previous section assumes that the PSF of the optical system is given for each image tile 60. In one aspect, there is utilized a consumer laser-printer to make a target pattern. To estimate the PSFs from the target images, it is natural to apply the same optimization framework that was used for image correction also for the PSF estimation step. This method is detailed below.

3.1 PSF Estimation as Inverse Imaging

The PSF estimation problem can be posed as a inverse imaging problem, where both a captured image 14 and a sharp image of the same scene are given. The captured image 14 is the scene imaged through the simple lens, with the aperture open, while the sharp image can be obtained by stopping the lens down to a small, almost pinhole aperture, where the lens aberrations no longer have an effect. By acquiring a sharp image this way (as opposed to a synthetic sharp image) we avoid both geometric and radiometric calibration issues in the sharp reference image.

Let J be an image patch in a considered blurred channel, I the corresponding sharp pinhole-aperture patch. We estimate a PSF $B_{opt}$ describing the blur in J by solving the minimization problem:

$$b_{opt} = \operatorname*{argmin}_{b} \|Ib - s \cdot j\|_2^2 + \lambda \|\nabla b\|_1 + \mu \|1^T b - 1\|_2^2 \quad (18)$$

where the first term is a linear least-squares data fitting term, and the scalar $s=\Sigma k_{k,l}I(k,l)/\Sigma_{k,l}J(k,l)$ accounts for the difference in exposure between the blurred and pinhole image. The second term represents a standard TV prior on the gradients of the recovered PSF, and the third term enforces an energy conservation constraint, i.e., $\Sigma_{k,l}B(k,l)=1$.

It may be note that Eq. (18) is a convex optimization problem. We derive a first-order primal-dual algorithm adopting the framework described in Sec. 2. Specifically, Eq. (18) is expressed using the following operators adopting the notation from before:

$$K(x) = \nabla x \quad (19)$$
$$F(y) = \|y\|_1$$
$$G(x) = \frac{1}{\lambda} \|Ib - s \cdot j\|_2^2 + \frac{\mu}{\lambda} \|1^T b - 1\|_2^2$$

The following resolvent operators and convex conjugates used to apply Algorithm 1 are then provided:

$$y = prox_{\sigma F^*}(\tilde{y}) \Leftrightarrow y_i = \frac{y_i}{\max(1, |\tilde{y}_i|)} \quad (20a)$$

$$K^* x = \nabla^* x = -divx \quad (20b)$$

However, the resolvent operator with respect to G(u) has to be derived for this problem. This can be expressed as a sequence of frequency domain operations:

$$u_{opt} = prox_{\tau G}(\tilde{u}) = \mathcal{F}^{-1}\left(\frac{\tau s \mathcal{F}(I)^* \mathcal{F}(j) + \frac{\lambda}{2}\mathcal{F}(\tilde{u}) + \tau \mu \mathcal{F}(1)}{\tau|\mathcal{F}(I)|^2 + \frac{\lambda}{2} + \tau \mu \mathcal{F}(0)}\right) \quad (21)$$

where O is a convolution matrix consisting only of ones.

Using these operators, can again apply Algorithm 1 can again be applied. The computation of L has been described in Sec. 2.4 and the same $\tau$ and $\sigma$ can be used.

3.2 Calibration Pattern

Figure 9:
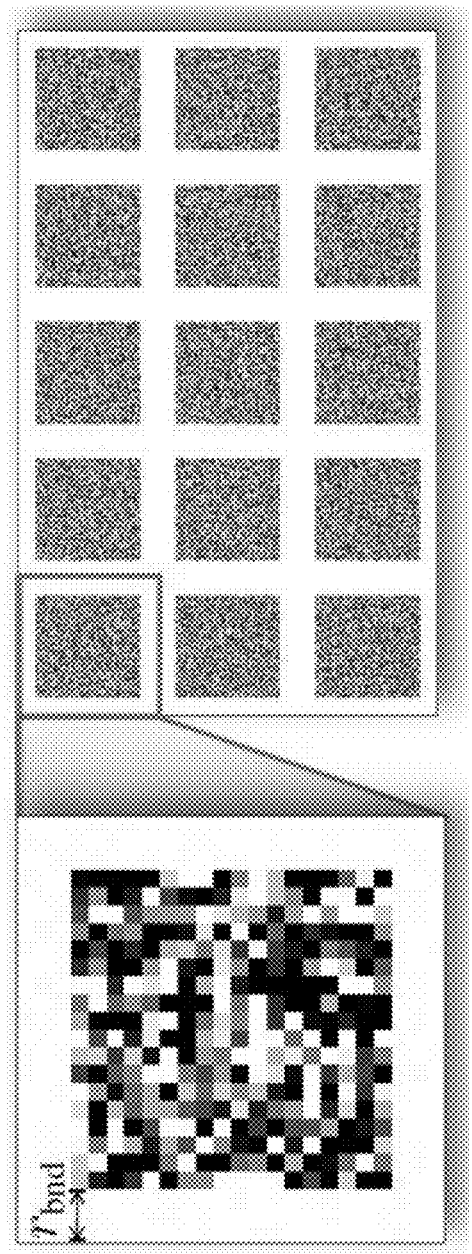
FIG. 9 illustrates a point spread function (PSF) calibration target.

To allow for robust PSF estimation, the scene used for this purpose should have a broad spectrum. A white noise pattern can therefore be adopted. One specific pattern, shown in FIG. 9, is subdivided into several noise patches, separated by a white border. Each noise tile produces a PSF for a single image tile, while the white frame helps suppress boundary effects in the PSF estimation process. This is because it enables a physically correct constant boundary condition around each patch if the frame width is $r_{bnd} \geq$ blur-radius (see again FIG. 1).

3.3 Full PSF Estimation Framework

To increase the efficiency of the PSF estimation, the above method can be applied in scale space by initializing the iterative minimization at each scale with the upsampled results from the next coarser scale, which yields a good starting point for the convex objective function from Eq. (18) and thus speeds up the minimization.

After the initial PSF estimation, an additional step of smoothing is performed by computing weighted averages of PSFs for a 3×3 set of neighboring tiles. Although the PSFs may contain high frequency features, these tend to change smoothly over the image plane. Combined with the relatively small tile size, it has been found that this spatial filtering does not cause feature loss, but can reduce noise significantly.

4.0 Multispectral Camera

The aberration correction method described herein cannot only be used for regular RGB cameras but also for multispectral imagers. In this case, the cross-channel prior is applied for all pairs of frequency bands. As with the conventional cameras, the method can successfully remove chromatic aberration and restore lost image detail in the blurred channels. Considering the wavelength-dependent PSFs here, it should be noted that the assumption of fixed PSFs for each color-channel of an RGB-sensor is often violated. This assumption is made for all the RGB sensor results in this paper and is a classical assumption in inverse imaging literature. However, one typically cannot tell from a tri-chromatic sensor the exact wavelength distribution.

Metamers (different spectra that produce the same tri-stimulus response) will have different blur kernels, so there can be situations where the assumption of fixed per-channel PSFs fails, such as for example light sources with multiple narrow spectra or albedos with very narrow color tuning. This introduces errors in the data-fitting term of the present objective function. Since the system has a strong cross-channel and image prior images can still be constructed with high quality.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the electronic device 10, any component of or related to the electronic device 10 (e.g. image correction module 12), etc., or accessible or connectable thereto. Any application or module herein described may be implemented using computer readable/executable instructions that may be stored or otherwise held by such computer readable media.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art.

The invention claimed is:

1. A method for solving inverse imaging problems in an image, the image comprising information on a plurality of channels, the method comprising:
   minimizing a cost objective function containing a data fitting term and one or more image prior terms to each of the plurality of channels, the one or more image prior terms comprising cross-channel information for the plurality of channels derived from the image; and
   solving each channel iteratively while holding other channels fixed by:
   jointly inverse imaging the image into corresponding channel information associated with each channel, said jointly inverse imaging comprising:
      decomposing the image into image components corresponding to respective channels;
      reconstructing the image by iteratively minimizing the cost objective function in one channel of the plurality of channels while maintaining the image components in a remaining one or more channels of the plurality of channels, wherein said minimizing the cost objective function comprises a comparison of image components in said one channel to image components in said remaining one or more channels and adjusting said image components accordingly; and
   outputting a reconstructed image.

2. The method of claim 1, wherein each channel comprises information from a range of electromagnetic frequencies.

3. The method of claim 1, wherein the image comprises information on a plurality of color channels.

4. The method of claim 1, wherein an image is divided into possibly overlapping tiles, and an inverse imaging sub-problem is solved independently in said tile.

5. The method of claim 1, further comprising repeating a minimization on each of the remaining one or more channels by maintaining the image components in other channels of said plurality of channels.

6. The method of claim 1, further comprising performing a calibration comprising:
   obtaining a calibration image of a target;
   generating a reference image for the target;
   comparing the calibration image to the reference image to determine a point spread function (PSF) value for each of a plurality of image tiles; and
   using the determined PSF values in the solution of inverse imaging problems.

7. The method of claim 6, further comprising at least one of comparing and averaging adjacent PSF values to reduce noise.

8. The method of claim 6, wherein the reference image is obtained synthetically or by obtaining another image with the camera using a different configuration.

9. The method of claim 6, wherein the joint inverse imaging further comprises utilizing information from a particular channel in the image to correct remaining ones of the plurality of channels in the image.

10. The method of claim 1, wherein the objective cost function is convex.

11. The method of claim 1, further comprising at least one of the following: chromatic aberrations, geometric aberrations, spatially varying aberrations, and compensating for motion blur due to movement of an imaging device.

12. The method of claim 1, wherein aberrations are introduced due to a lens of an imaging device capturing the image.

13. The method of claim 1, wherein the cost objective function includes at least one of: an effect of a color filter array (CFA), and an effect of a down-sampled image sensor resolution.

14. The method of claim 1, wherein the reconstructed image corresponds to a global minimum of the cost objective function.

15. The method of claim 1, wherein the image prior terms include a term for cross-channel information for dark intensity regions.

16. The method of claim 1, wherein the channels comprise color information representing light wavelengths in the visible range.

17. The method of claim 1, wherein the channels represent at least one of: electromagnetic radiation in the visible range, and electromagnetic radiation in the non-visible range.

18. The method of claim 1, wherein the image comprises values between A and B.

19. The method of claim 18, wherein the image has been offset by +α to include values between A+α and B+α.

20. The method of claim 18, wherein a resultant improved image has been negatively offset by the addition of −α, to contain values between A and B.

21. The method of claim 1, wherein the image is captured using an imaging device comprising one or more lens elements.

22. A non-transitory computer readable medium comprising computer executable instructions for solving inverse imaging problems to compensate for distortions in an image, the image comprising information on a plurality of channels, comprising computer executable instructions for:
   minimizing a cost objective function containing a data fitting term and one or more image prior terms to each of the plurality of channels, the one or more image prior terms comprising cross-channel information for the plurality of channels derived from the image; and
   solving each channel iteratively while holding other channels fixed by:
   jointly inverse imaging the image into corresponding channel information associated with each channel, said jointly inverse imaging comprising:
      decomposing the image into image components corresponding to respective channels;
      reconstructing the image by iteratively minimizing the cost objective function in one channel of the plurality of channels while maintaining the image components in a remaining one or more channels of the plurality of channels, wherein said minimizing the cost objective function comprises a comparison of image components in said one channel to image components in said remaining one or more channels and adjusting said image components accordingly; and
   outputting a reconstructed image.

23. The non-transitory computer readable medium of claim 22, wherein the image comprises information on a plurality of color channels.

24. An electronic device comprising a processor and memory, the memory computer executable instructions for solving inverse imaging problems to compensate for distortions in an image, the image comprising information on a plurality of channels, comprising computer executable instructions for:
   minimizing a cost objective function containing a data fitting term and one or more image prior terms to each of the plurality of channels, the one or more image prior terms comprising cross-channel information for the plurality of channels derived from the image; and
   solving each channel iteratively while holding other channels fixed by:
   jointly inverse imaging the image into corresponding channel information associated with each channel, said jointly inverse imaging comprising:
      decomposing the image into image components corresponding to respective channels;
      reconstructing the image by iteratively minimizing the cost objective function in one channel of the plurality of channels while maintaining the image components in a remaining one or more channels of the plurality of channels, wherein said minimizing the cost objective function comprises a comparison of image components in said one channel to image components in said remaining one or more channels and adjusting said image components accordingly; and
   outputting a reconstructed image.

25. The electronic device of claim 24, wherein the image comprises information on a plurality of color channels.

26. The computer readable medium of claim 22, wherein an image is divided into possibly overlapping tiles, and an inverse imaging sub-problem is solved independently in said tile.

27. The computer readable medium of claim 22, further comprising instructions for repeating a minimization on each of the remaining one or more channels by maintaining the image components in other channels of said plurality of channels.

28. The computer readable medium of claim 22, further comprising instructions for performing a calibration comprising:
   obtaining a calibration image of a target;
   generating a reference image for the target;
   comparing the calibration image to the reference image to determine a point spread function (PSF) value for each of a plurality of image tiles; and
   using the determined PSF values in the solution of inverse imaging problems.

29. The electronic device of claim 24, wherein an image is divided into possibly overlapping tiles, and an inverse imaging sub-problem is solved independently in said tile.

30. The electronic device of claim 24, further comprising instructions for repeating a minimization on each of the remaining one or more channels by maintaining the image components in other channels of said plurality of channels.

31. The electronic device of claim 24, further comprising instructions for performing a calibration comprising:
   obtaining a calibration image of a target;
   generating a reference image for the target;
   comparing the calibration image to the reference image to determine a point spread function (PSF) value for each of a plurality of image tiles; and
   using the determined PSF values in the solution of inverse imaging problems.

* * * * *